Figure 4:
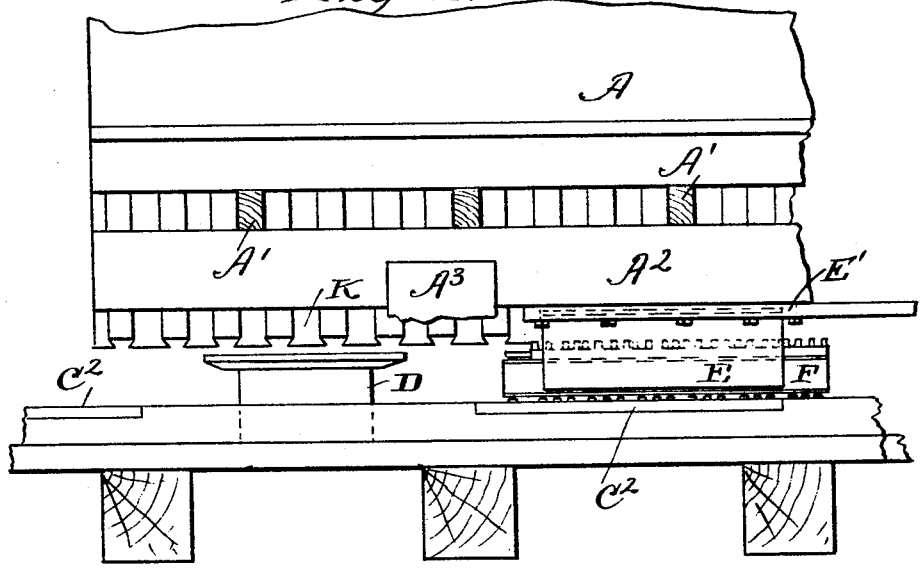

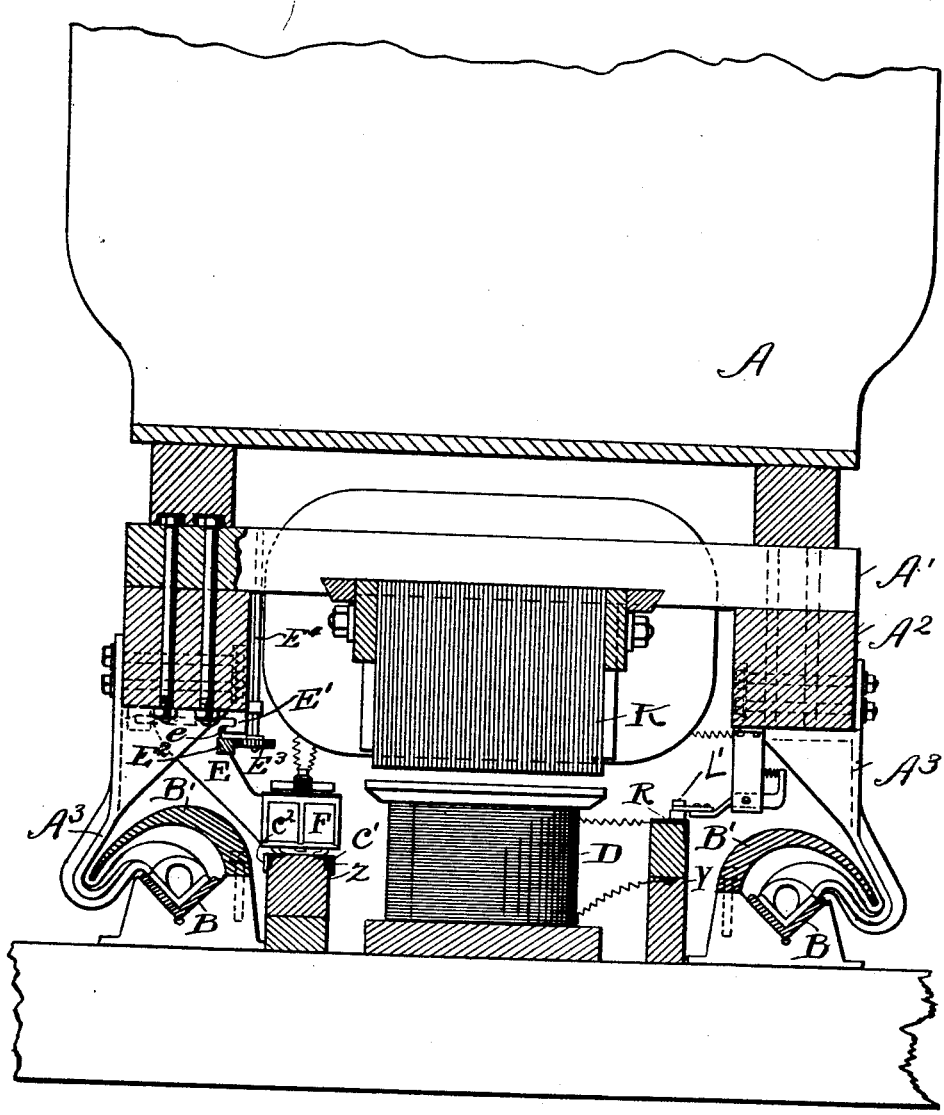

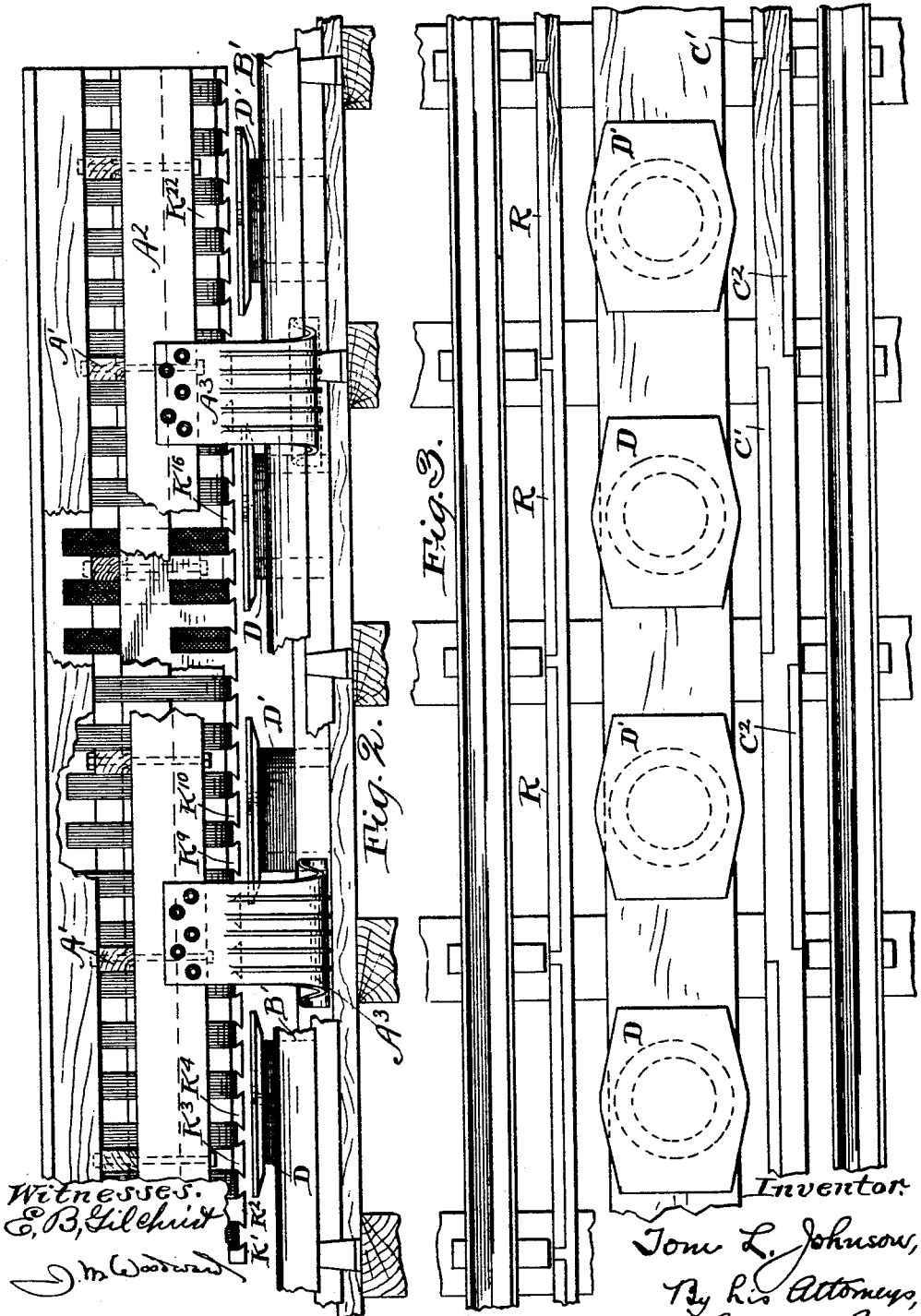

T. L. JOHNSON, DEC'D.
M. J. JOHNSON, ADMINISTRATRIX.
HIGH SPEED RAILROAD.
APPLICATION FILED APR. 20, 1905.

1,123,305.

Patented Jan. 5, 1915.

6 SHEETS—SHEET 3.

T. L. JOHNSON, DEC'D.
M. J. JOHNSON, ADMINISTRATRIX.
HIGH SPEED RAILROAD.
APPLICATION FILED APR. 20, 1905.

1,123,305.

Patented Jan. 5, 1915.
6 SHEETS—SHEET 4.

Witnesses.
E. B. Gilchrist
J. M. Woodward

Inventor.
Tom L. Johnson,
By his Attorneys,
Thurston M. Bates

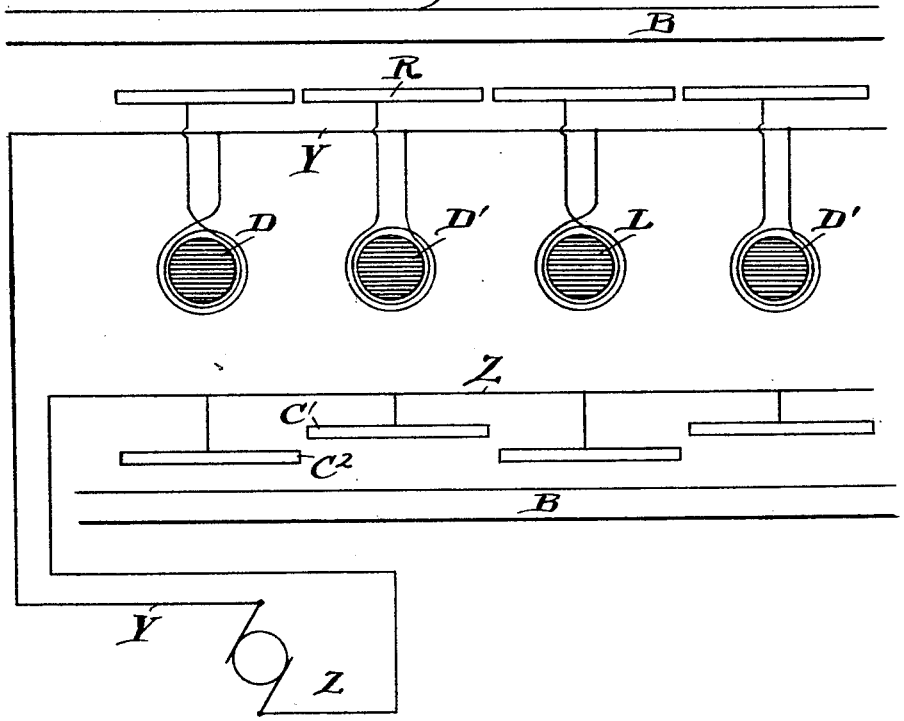
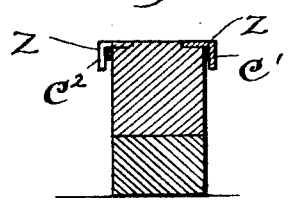
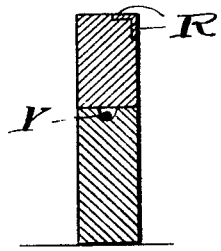

UNITED STATES PATENT OFFICE.

TOM L. JOHNSON, OF CLEVELAND, OHIO; MARGARET J. JOHNSON ADMINISTRATRIX OF SAID TOM L. JOHNSON, DECEASED.

HIGH-SPEED RAILROAD.

1,123,305.   Specification of Letters Patent.   Patented Jan. 5, 1915.

Application filed April 20, 1905.   Serial No. 256,625.

*To all whom it may concern:*

Be it known that I, TOM L. JOHNSON, a citizen of the United States, residing at Cleveland, in the county of Cuyahoga and State of Ohio, have invented a certain new and useful Improvement in High-Speed Railroads, of which the following is a full, clear, and exact description, reference being had to the accompanying drawings.

In the attainment of high speeds on railroads, as at present operated, the limit is soon reached by reason of the centrifugal force developed by the rapidly rotating parts. In locomotives and motors the centrifugal strains developed have frequently resulted in the bursting of the wheels, armatures and like portions of the mechanism. Further, it may be stated that the friction in the bearings of the rotating members is by no means inconsiderable, and the heating of these bearings is a source of great annoyance and care.

The object of this invention is to provide a railway which shall have no rotating parts whatever, whereby a very high speed is possible. In accomplishing this, I have devised a car supported by shoes which slide upon the track and magnetic mechanism installed partly along the track and partly on the car for furnishing means of propulsion. Thus, this invention includes broadly the combination of a sliding car and magnetic propelling means. In rendering such combination practicable, I provide grooved rails which, being trough-shaped, are adapted to carry oil or other lubricant, and I provide a cover over the trough so shaped as to prevent access of dirt, water, snow and the like.

To propel the car I provide a series of magnets along the track and other magnets on the car, which latter are energized by current communicated by contact brushes which engage suitable contact rails along the track. These contact rails are arranged to constitute, with the brushes, a current changing or diverting mechanism adapted to continuously change the direction of the current through the car magnets as the car proceeds.

The track magnets are placed at suitable intervals along the track-way and are wound so that they are alternate as to their polarity when excited, that is to say, the alternate magnets present south poles, while the intermediate magnets present north poles to the car moving over them. The car magnets are so wound as to be of constantly changing polarity when the car moves, but, considered as a single group, their polarity, relative to the track magnet remains the same, that is, opposite to that track magnet in front, and the same as that of the magnet behind. Thus the action of the system is to constantly move the car and its magnets forward through the attraction of the track magnets. As the car moves forward under this influence, the polarity of the car magnet is automatically changed in such manner that as any individual pole piece of the car magnets becomes proximate to the attracting track magnet, the magnetization of the former shall cease, and as it passes beyond such track magnet, its polarity shall be reversed.

Figure 5:
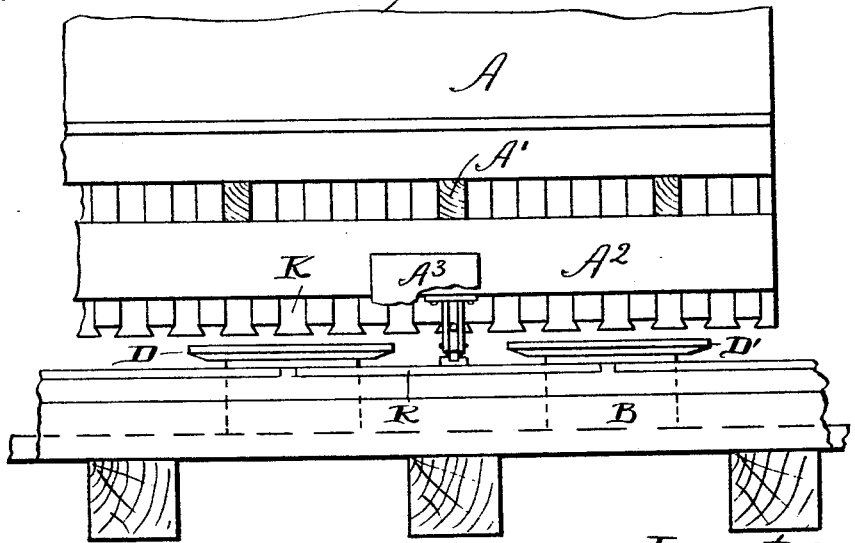
Figure 6:
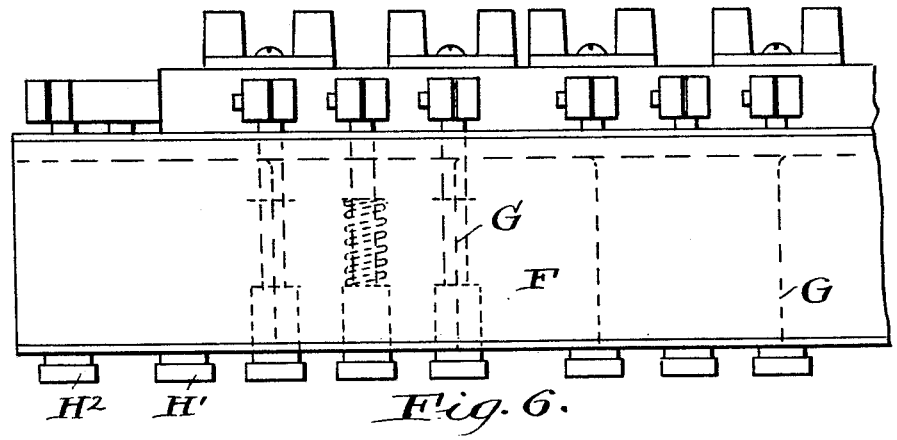
Figure 7:
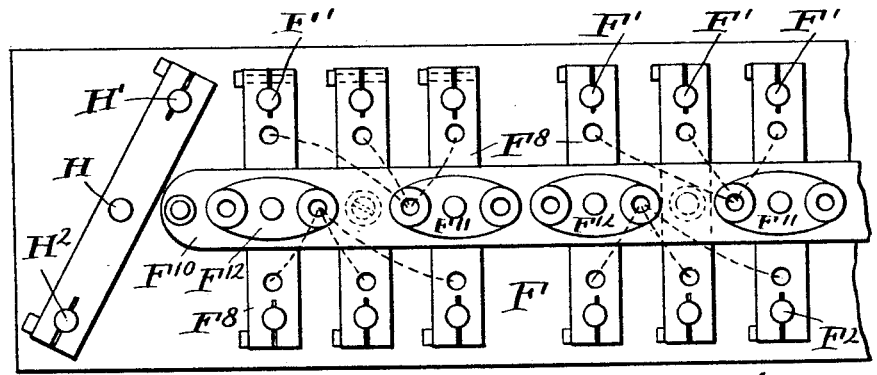
Figure 8:
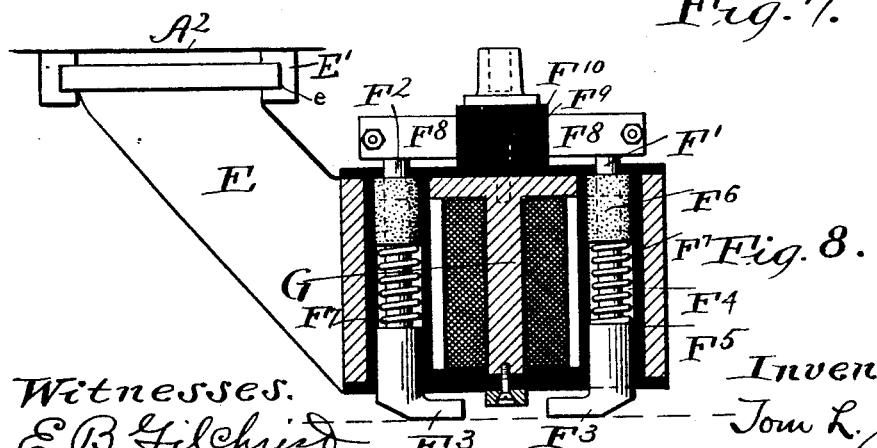
Figure 9:
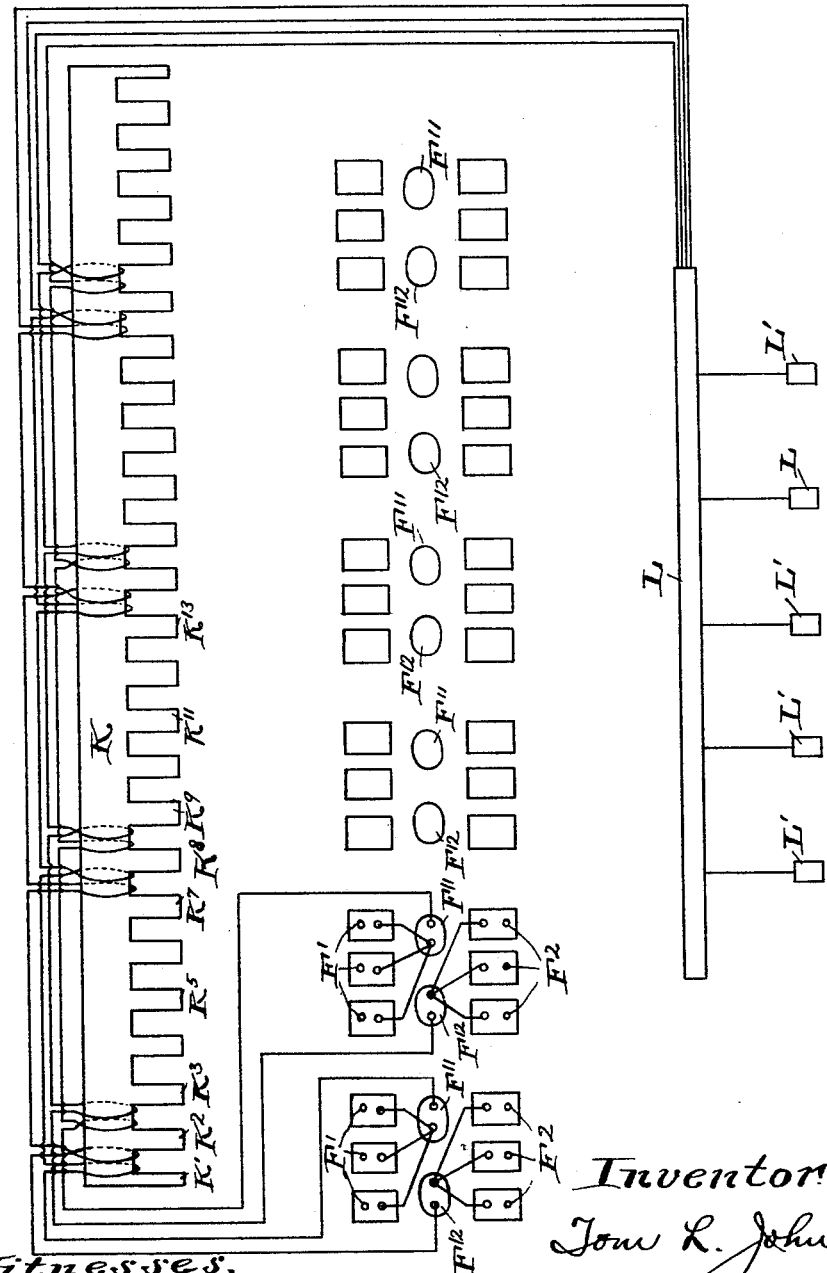

In the drawings, which illustrate my invention, Figure 1 is a cross section through the car support and track showing certain parts in elevation in such wise as to illustrate the general relationship of the parts. Fig. 2 is a detail side elevation with parts broken away so as to show the car magnets. Fig. 3 is a plan view of the supporting track showing the contact rails and the track magnets. Fig. 4 is a detail side elevation with a supporting shoe broken away, taken from the side carrying the brushes. Fig. 5 is a similar view taken from the side carrying the contact shoes which pass the current to the return lead. Fig. 6 is a detail side elevation of the brushes showing certain features of construction in dotted lines. Fig. 7 is a detail plan of the brushes. Fig. 8 is a cross section of one of the brushes. Fig. 9 is a diagram illustrating the windings of the car magnets. Fig. 10 is a diagrammatic plan illustrating the windings of the track magnets. Figs. 11 and 12 are detail sections illustrating a preferred method of arranging the current leads.

Referring to the drawings, it will be seen that the body of the car A is suported upon a suitable frame having cross beams A' and side beams A², which in turn are supported by goose necked shoes A³ bolted thereto. These shoes are provided at their ends with bearing surfaces of suitable contour and cross sections to ride smoothly in the trough like track and are preferably perforated longitudinally in such wise as to allow whatever surplus lubricant may tend to accumulate in front thereof to pass readily to the rear. The track B is preferably trough-shaped and is provided with a protecting cover B'. The cover for the track is sufficiently overlapping to fully protect it against the intrusion of foreign matter. The length of the bearing surfaces of the sliding supporting shoes should be great enough to produce a supporting area of such extent that the pressure per unit area will not be enough to force out the oil or other lubricant from thereunder.

Alongside of the track, and preferably between the supporting rails, are the contact rails $C'$ $C^2$ and R and track magnets D, D'. These contact rails are in sections, the rail sections $C'$ $C^2$ being each connected directly to one of the main current wires, for instance, the positive feed Z, while the sections R are connected, each through a track magnet, with the return Y. The various sections are, of course, properly supported on non-conducting material and they are spaced slightly apart and insulated from each other. The sections $C'$ $C^2$ also equal the number of track magnets and are placed opposite the sections R, but only the alternate sections are in line with each other. This arrangement is for the purpose of feeding the current alternately to two sets of collecting brushes that are arranged to pass thereover.

In the construction shown I form the contact rails $C'$ $C^2$ and R of angle strips and secure them respectively about the corners of wooden beams. The positive feed Z (see Figs. 1 and 11) is shown as divided into two portions, which are copper ribbons, one ribbon running beneath and in contact with the sections $C'$ the other being beneath and in contact with sections $C^2$. These ribbons are at intervals connected, one with the other, to insure proper and even feed. The return Y (see Figs. 1 and 12), I have shown as buried in a groove between the two beams carrying the contact rail sections R, with each of which sections the return is connected through a track magnet.

Carried by a suitable bracket E slidably supported from the car, are a series of collector brushes F arranged to slide over the positive contact rails $C'$ $C^2$. The bracket E has a range of longitudinal movement in the channels $e$, in the hangers E' sufficient to enable the operator to shift it the length of a contact rail section in order that, when a reversal in the direction of propulsion is desired, the series of collector brushes may be so shifted as to reverse the magnetic relationship between the track magnets and the car magnets. Any suitable form of mechanism may be utilized to shift the bracket E along its guideways, and in the drawing, I have shown a simple form of shifting mechanism which includes a rack $E^2$ carried by the bracket and movable therewith, and a pinion $E^3$ which engages the rack and is secured to the lower end of a vertical shaft $E^4$ which extends upwardly into the car body and is designed to be turned or rotated by any actuating member which answers the requirements. Considering the detail structure of this series of brushes F, it will be seen from Figs. 4, 6, 7 and 8, that it is divided into six independent groups of six brushes each. In each group there are arranged three brushes F', F', F', on one side so as to ride over one line $C'$ of positive contact rails, while the three brushes $F^2$ $F^2$ $F^2$ on the opposite side of the group will ride over the other line, $C^2$, of positive contact rails.

As shown, the individual contact members are of pencil form terminating in toes $F^3$ of suitable shape to pass along the surface of the rails. The bodies of the pencils are guided in holes $F^4$ through the frame of the collecting and diverting mechanism, and are protected by suitable insulating sleeves $F^5$ and bushings $F^6$. A spring $F^7$ interposed between a shoulder on the pencil and the bushing $F^6$ tends to keep the toe in close contact with the rail. Secured about the upper end of the pencil outside of the holes $F^4$ is a clamp $F^8$ of any suitable conducting material. This clamp at its inner end $F^9$ is shaped to bear close against the flat side of a non-conducting rib $F^{10}$ extending the length of the brushes, which rib carries the collecting terminals $F^{11}$ and $F^{12}$. By thus shaping and arranging the clamps they will prevent the brushes from turning out of their proper position.

Each clamp has a suitable socket or post, from which wires lead to the proper terminals. It will be seen on referring to Fig. 7 that the current from the three brushes F' F' F' on one side of each group is led to one terminal $F^{11}$, while the current coming from the three brushes $F^2$ $F^2$ $F^2$ on the opposite side is led to a second terminal $F^{12}$. From these collecting terminals the current is carried up into the car and through the coils about the car magnets out to a bus bar L and the return contact brushes $L^1$ which ride over the return contact rails R. The purpose of this subdivision of the collectors into three members, spaced somewhat apart as they are, is to eliminate sparking, and to effect a more gradual switching of the current from one group of collectors to the group opposite thereto. It will be seen that as one group of three is sliding off its rail section, the group opposite thereto will be sliding onto its corresponding rail section; the first collecting member of one group and the last collecting member of the other group being in contact with their respective rail sections simultaneously. It is preferred to make the end members of each group of some material having greater resistance than the middle member. For the purpose of further insuring the absence of sparking, I have made use of the well known action of the magnetic flux upon electric sparks, and have so placed electromagnets with regard to the gap at which there is a tendency to spark, that the magnetic flux referred to will "blow out" whatever sparks may tend to pass across the gaps.

In the detail construction shown, the frame of the collecting and diverting brushes is provided centrally with depending cores G located between the collecting members of each group of collectors. These cores have suitable winding so that when a current is flowing through the winding, the lower ends of the cores form one pole, while the opposite pole will be found along the lower edges of the outer depending flanges of the frame, thus insuring that the magnetic flux will pass about the ends of the brushes and across the spark gaps.

Carried by the frame at one end thereof are a pair of permanent collecting brushes $H^1$, $H^2$ depending one from each side of the frame, disposed diagonally with regard to each other, and having a common terminal socket H. The brush $H^1$ is placed to travel over the sections $C^1$ and the brush $H^2$ travels over sections $C^2$. By this diagonal disposition, the brush $H^1$ does not pass off of a section $C^1$ until the brush $H^2$ passes onto a section $C^2$. Thus, it will be seen that a current is always passing up through one or the other of these permanent collecting brushes, and this current is led to the lighting system of the car and to the electromagnets used for preventing sparking at the brushes.

Referring now to Figs. 1 and 2 it will be seen that the various car magnets, which collectively may be considered as an armature with regard to the field created by the track magnets, are formed of thin long strips having depending pole pieces at intervals. These strips placed side by side form a laminated core K about which the windings are made.

The pole pieces $K^1$ $K^2$ $K^3$, etc., on the car are of any suitable number, and are so wound as to be divided into groups of electromagnets. In the instance shown there are four groups of six each,—each group being of such length that the corresponding pole pieces of the several groups shall be respectively in similar or corresponding position with regard to any two adjacent track magnets.

Wires lead from the several collecting terminals $F^{11}$, $F^{12}$ of the brushes to the car magnets and are suitably wound thereon. The wires leading from the first group of collecting brushes are each wound about the core of car magnets in the space between the first two pole pieces $K'$ and $K^2$, but the wire from the terminal $F^{11}$ is wound in a direction opposite to the winding of the wire leading from the terminal $F^{12}$. These two wires are then led along to the space between the first two pole pieces $K^7$ and $K^8$ in the second group, where they are wound about the core, each in a direction the reverse of its winding in the first group. These wires are then led along to the first space in each succeeding group, being in every instance wound opposite to each other and undergoing a reversal of its own direction at each succeeding group.

The wires from the terminals of the second group of brushes are wound about the core of the car magnet in the second space of each group in a manner exactly similar to that above described. In a similar manner the wires leading from the succeeding groups of brushes are wound in the succeeding spaces of the first, second, etc., groups of car magnets, so that all the spaces of each group contain pairs of reversely wound magnetizing coils. From the last group (there being but four groups shown, but any number being permissible within practical limits) the wires are each led to the common bus bar L (see Fig. 9) from which depend several contact brushes $L'$ $L'$, of which there are any suitable number, five being shown, so disposed and spaced as to insure that they will always form contact with a sufficient number of the rail sections R to energize the proper number of track magnets so that one track magnet is always in front of the car magnets and one in the rear thereof. From this system of wiring it will be apparent that there should be a number of groups of collectors equivalent to the number of pairs of windings in each group of the car magnets—in this case six. The length of the collector or current diverter is that of one of the sections of the contact rails $c'$ or $c^2$ over which it rides, as will be seen by referring to Fig. 4.

From the above description it will be seen that the parts are easily arranged so that the direction of current through the car magnet coils is constantly changing as the car advances, by reason of the fact that the brushes, first on one side $F'$, and then on the other $F^2$, come in engagement with the rail sections connected to the lead wires. Simultaneously with the energization of the car magnets, the current passing down through the bus bar L and the return contact rails R energizes the track magnets in such manner as to draw the car forward.

As the car moves and the current is collected alternately by opposite sides of the collector or current diverter and transmitted through the coils about the car magnets in reverse directions, the individual pole pieces are, of course, changed in the character of their magnetization. As before stated, this change is effected in such manner as to cause the polarity to be opposite that of the track magnet which it approaches, neutral while over it, and similar thereto when past it. Thus through the operation of the collecting and diverting system and the reverse winding of each alternate track magnet, the pole pieces constantly change the actual character of their magnetization, but retain the same relative character with regard to the track magnets so that there is a continuous attraction forward.

It will be seen that this system of propulsion is devoid of rotating parts of any kind and, when combined with a sliding track, an enormous speed may be attained. This high speed would be unattainable were it not for my slide track way, for the friction and centrifugal force of the rotating wheels of the car would soon establish a limit to the speed. On the other hand, obviously, the advantages of the sliding track way would be neutralized were there rotating driving means for the car. By the combination of the magnetic propulsion and the sliding shoes on a lubricated track, the speed limit attainable is very greatly increased.

Throughout the specification, I have referred to the motor means installed on the car as made up of magnets, but I wish it to be understood that I do this merely because of the common use of this expression by workers in the art, but as a matter of fact, I regard this system of constantly shifting magnetic poles as being a true armature with regard to the field formed by the track magnets.

I claim:

1. In combination with a track, a car thereon, magnetic means for propelling the car disposed partly on the car and partly along the track, the magnetic means in one of said parts including a magnet having oppositely wound coils adapted to be alternately energized, and current diverting means for causing said coils to be alternately energized so as to change the polarity of the magnet as the car advances.

2. In combination with a track, a car thereon, a series of magnets along the track, a magnet on the car provided with a pair of oppositely wound coils, current supplying conductors arranged along the track, and collecting and current diverting means for causing the current to pass alternately through said oppositely wound coils so as to reverse the polarity of the magnet on the car as the car advances.

3. In combination with a track, a car mounted thereon, magnetic propelling means arranged part along the track and part on the car, the part of the magnetic means on the car having oppositely wound coils adapted to be separately energized, current supplying conductors, and current collecting and diverting means for successively and alternately energizing said oppositely wound coils as the car advances.

4. In combination, a track, a car mounted thereon, a series of electro-magnets arranged along the track, an electro-magnet on the car and provided with oppositely wound coils, current supplying conductors along the track, and means comprising current collecting devices carried by the car and connected to said coils, and contact rails along the track adapted to be engaged by said collecting devices, and connected to the electro-magnets along the track for successively energizing magnets along the track and for causing current to pass through said coils of the car magnet alternately so as to continually reverse the polarity of the car magnet as the car advances.

5. In a traction system, a track, a car supported thereon, electro-magnets arranged along the track, an electro-magnet carried by the car and adapted to coöperate with the electro-magnets along the track, said car magnet having a pair of oppositely wound coils, and a system for collecting current and for causing the same to be passed alternately through the two coils of the car magnet so as to change the polarity of the magnet as the car advances, comprising staggered contact rails along the track and two groups of brushes carried by the car, one group being connected to one of the coils of the car magnet and adapted to engage part of the contact rails, and the other group being connected to the other coil and adapted to engage the other contact rails.

6. In a traction system, a track, a car movably supported on the track, means for propelling the car comprising magnetic means along the track, electromagnetic means carried by the car and adapted to coöperate with the magnetic means along the track, collecting brushes carried by the car and connected to said electromagnetic means, contact rails arranged in sections along the track so as to be successively engaged by the brushes to supply current to the electromagnetic means on the car and to change its polarity as the car progresses along the track, said brushes being mounted for movement relative to the car from one contact rail section to another.

7. In combination, a track, a car adapted to move along the same, a propulsion system comprising electromagnets arranged along the track, an electromagnet on the car having groups of oppositely wound coils, current supplying conductors, and means for causing the electromagnets along the track to be successively energized, and for causing current to pass alternately through the groups of coils of the electromagnet on the car so that the polarity of said electromagnet will be continually reversed as it passes the electromagnets along the track.

8. In combination, a track, a car adapted to move along the same, track magnets arranged along the track, a car magnet comprising a core having a plurality of poles, and a plurality of groups of coils for energizing the core, there being two groups of oppositely wound coils for each pole, current supplying conductors, and means for successively energizing the track magnets, and for energizing the car magnet and reversing the polarity of the car magnet, by causing current to pass alternately through the coils of each pole wound in one direction and thence through the coils wound in the opposite direction.

In testimony whereof, I hereunto affix my signature in the presence of two witnesses.

TOM L. JOHNSON.

Witnesses:
ALBERT H. BATES,
J. M. WOODWARD.

Copies of this patent may be obtained for five cents each, by addressing the "Commissioner of Patents, Washington, D. C."